United States Patent [19]

Chung

[11] Patent Number: 5,001,808
[45] Date of Patent: Mar. 26, 1991

[54] SHIELDED CASTOR WITH SPRING

[76] Inventor: Chin-Fu Chung, No. 18, Shin-Shinn Rd., Tai Nan City, Taiwan

[21] Appl. No.: 501,110

[22] Filed: Mar. 29, 1990

[51] Int. Cl.⁵ .................. B60B 33/00; A47B 91/00
[52] U.S. Cl. .................................. 16/18 CG; 16/19; 16/32; 16/33; 16/44
[58] Field of Search ............. 16/44, 32, 33, 19, 18 CG

[56] References Cited

U.S. PATENT DOCUMENTS

| | | | |
|---|---|---|---|
| 172,013 | 1/1876 | Garretson | 16/19 |
| 1,019,302 | 3/1912 | Butcher | 16/32 |
| 2,613,389 | 10/1952 | Cramer | 16/44 |
| 3,121,556 | 2/1964 | Faulkner | 16/33 |

Primary Examiner—Richard K. Seidel
Assistant Examiner—Carmine Cuda
Attorney, Agent, or Firm—Varndell Legal Group

[57] ABSTRACT

A castor, which can efficiently absorb shock and the ball wheel of which can be alternatively received in or protruding beyond a cup-like shield thereof for positioning or moving. The caster comprises a sleeve which is secured to a hoop on the frame of a baby-walker for receiving a spring and a central shaft which comprises a ball wheel on the bottom. The sleeve comprises a Z-shaped track on its wall surface for the sliding and positioning therein of a lateral guide which is inserted therethrough and secured to the central shaft. A cup-like shield is secured to the bottom end of the sleeve to protect the ball wheel.

3 Claims, 2 Drawing Sheets

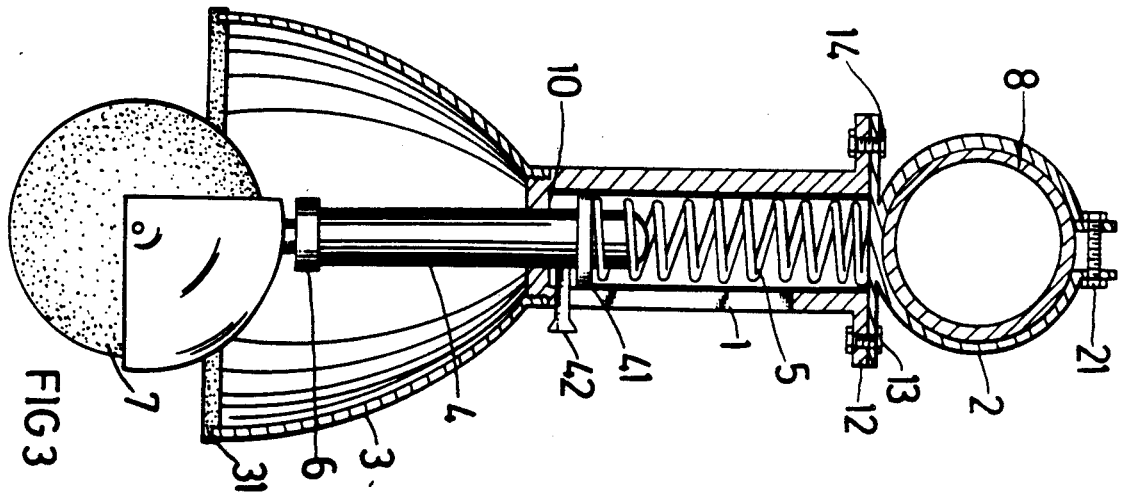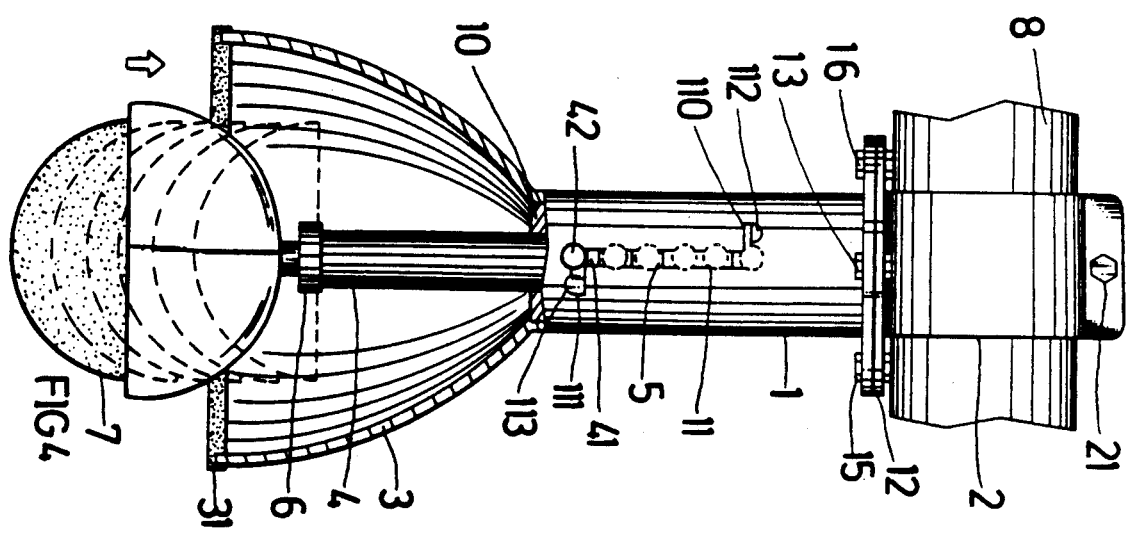

SHIELDED CASTOR WITH SPRING

BACKGROUND OF THE INVENTION

The present invention is related to castors and more particularly to a castor for baby-walker and other movable objects.

Regular baby-walkers are generally fastened with fixed rollers or castors for moving. The rigid structure of the rollers or castors can not provide any shock absorbing effect. Therefore, a baby may be easily hurt while learning to walk by means of a baby-walker.

SUMMARY OF THE INVENTION

One object of the present invention is to provide a castor for baby-walker and other movably objects which includes a suspension system to absorb shock so that the ball wheel thereof can be smoothly and stably move along the surface of the ground.

Another object of the present invention is to provide a castor which includes a spring specially designed to permit the ball wheel thereof to be automatically received inside a cup-like shield so that the movable objects can stand firmly on the ground when a baby sits down, and to permit the ball wheel thereof to be automatically protruding beyond for rolling so that the movable objects can be moved along the ground when a baby stands up.

Still another object of the present invention is to provide such a castor for baby-walker, in which the ball wheel can be fixedly received in a cup-like shield permitting the positioning of a baby-walker on the ground, or fixedly set to protrude beyond a cup-like shield permitting the moving of a baby-walker on the ground.

BRIEF DESCRIPTION OF THE DRAWINGS

The present invention will now be described by way of example, with reference made to the annexed drawings, in which:

FIG. 3 is a sectional front view of the castor of FIG. 1; and

FIG. 4 is a partly right side sectional view, illustrating the operation of the present invention.

DETAILED DESCRIPTION OF THE PREFERRED EMBODIMENTS

Figure 1:
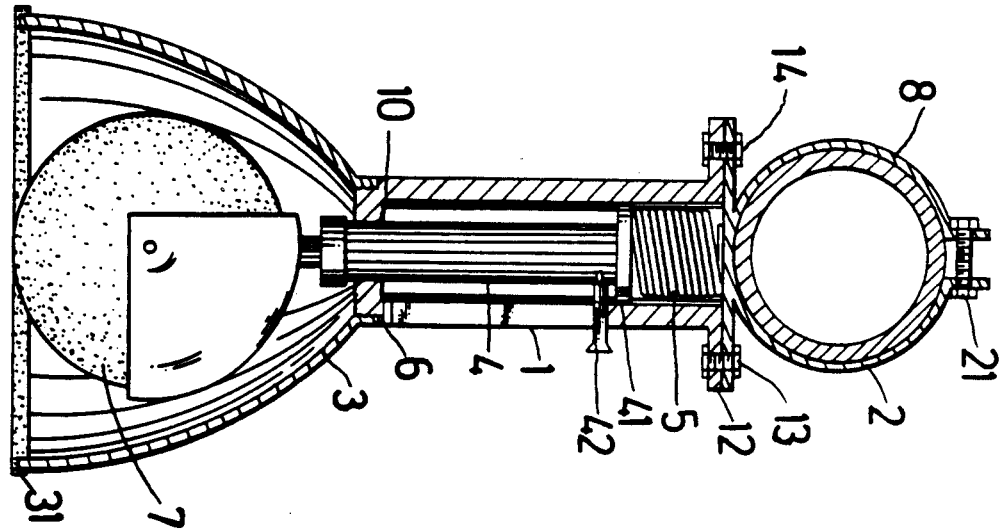
FIG. 1 is a sectional front view of a castor embodying the present invention.
Figure 2:
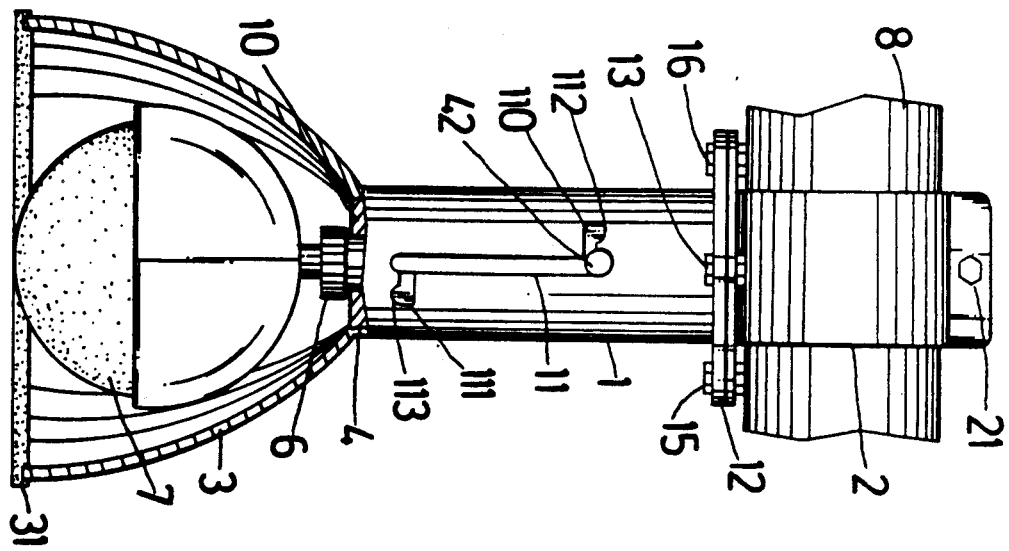
FIG. 2 is a sectional right side view of the castor of FIG. 1

Referring to FIGS. 1 and 2, a castor in accordance with the present invention is generally comprised of a a vertical sleeve 1, a circular steel hoop 2, a cup-like shield 3, a central shaft 4, a spring 5, an universal knuckle 6 and a ball wheel 7. The sleeve 1 comprised a substantially Z-shaped track 11 which includes an upper, leftward branch track 110 and a lower, rightward branch track 111, an internal flange 10 in the bottom for supporting the central shaft 4, and an external flange 12 on the top for securing to a bottom plate 20 of the circular hoop 2 by means of four screws 13, 14, 15 and 16. The circular hoop 2 is fixedly secured to the frame 8 of a baby-walker by mean of a lock screw 21. The cup-like shield 3 is secured to the bottom end of the sleeve 1 by means of screw joint permitting the central shaft 4 to move vertically therethrough. A rubber cushion 31 is mounted on the circular bottom edge of the cup-like shield 3 to strengthen its friction against the ground.

The spring 5 and the central shaft 4 are set in the boring bore of the sleeve 1 permitting the top end of the spring 5 to stop against the bottom surface of the bottom plate 20 of the circular steel hoop 2 and the bottom end of the spring 5 to stop against the collar 41 of the central shaft 4. The central shaft 4 comprises a bolt hole in its upper end beneath its collar 41 for the fastening therein of a lateral guide 42 which is inserted through the Z-shaped track 11 of the sleeve with its one end exposed out of the sleeve 1 to control the moving range of the central shaft 4 within the Z-shaped track 11. The central shaft 4 partly extends out of the sleeve 1 inside the cup-like shield 3 for the connection thereto of the universal knuckle 6 and the ball wheel 7.

The operation of the present invention is outlined hereinafter. When a baby is sitting in a baby-walker according to the present invention, the downward pressure of the body weight of the baby forces the ball wheel 7 of the castor to retreat in the cup-like shield 3 permitting the rubber cushion 31 of the cup-like shield 3 to contact the ground. Under this condition, the lateral guide 42 is moved to the upper limit position in the Z-shaped track 11 and the spring 5 is squeezed to compress on the central shaft 4 (see FIGS. 1 and 2). As soon as the baby stands up, the central shaft 4 of the castor of the baby-walker is immediately forced by the spring 5 to extend downward permitting the ball wheel 7 to protrude beyond the cup-like shield 3 (see FIGS. 3 and 4). Under this condition, the lateral guide 42 is moved to the lower limit position in the Z-shaped track. By means of the effect of the spring 5, the ball wheel 7 is permitted to float within the range of the Z-shaped track 11. Therefore, the ball wheel 7 can be smoothly moving along the surface of the ground while the baby is walking in the baby-walker, and the spring 5 serves as a suspension system to reduce the vibration of the baby-walker. When the baby is sitting down, the friction effect of the rubber cushion 31 stabilizes the positioning of the baby-walker on the ground.

The lateral guide 42 may be move upward to set in the upper circular hole 112 of the upper branch track 110 so that the ball wheel 7 can be constantly and completely received inside the cup-like shield 3, or the lateral guide 42 may be moved downward to set in the lower circular hole 113 of the lower branch track 111 to let the ball wheel 7 constantly protrude beyond the cup-like shield 3 so that the baby-walker can be freely moved to steer. The arrangement of the upper circular hole 112 and the lower circular hole 113 is for the positioning of the lateral guide 42 in the upper branch track 110 or lower branch track 111 to protect the lateral guide 42 from breaking away.

As indicated above, the present invention is to provide such a design of castor which is practical for use in a baby-walker to ensure maximum safety. The present invention can also be used as a castor for chairs, blocks, ladders or some other moving objects.

As foregoing statement, the present invention may be variously embodied. Recognizing various modification been apparent, the scope herein shall be deemed as defined in the claims set forth hereinafter.

I claim:

1. A castor, including
   a sleeve secured to a circular hoop on the frame of a baby-walker by means of screws, having a Z-shaped track on its wall surface and an inner flange on its bottom end;

a cup-like shield secured to the bottom end of said sleeve;

a central shaft comprising a collar on its upper end and being movably fastened in said sleeve with its collar stopped against said inner flange;

a lateral guide inserted through said Z-shaped track and secured to said central shaft permitting its one end to protrude beyond said sleeve;

a spring received in said sleeve with its one end stopped against the bottom surface of said circular hoop and its other end stopped against said collar; and a ball wheel secured to the bottom end of said central shaft by means of an universal knuckle.

2. A castor according to claim 1, wherein said Z-shaped track includes an upper, leftward branch track and a lower, rightward branch track so that said ball wheel can be controlled by said lateral slide to constantly be received in said cup-like shield or protrude therebeyond.

3. A castor according to claim 1, wherein said upper, leftward branch track and said lower, rightward branch track each comprises a circular hole at an inner side for retaining said lateral guide.

* * * * *